United States Patent [19]
Kohler

[11] 3,988,733
[45] Oct. 26, 1976

[54] VOR RECEIVER WITH IMPROVED PERFORMANCE IN A DOPPLER NAVIGATION SYSTEM

[75] Inventor: Karl Kohler, Ditzingen, Heimerdingen, Germany

[73] Assignee: International Standard Electric Corporation, New York, N.Y.

[22] Filed: Apr. 22, 1974

[21] Appl. No.: 462,645

[52] U.S. Cl. .................. 343/106 D; 343/108 M
[51] Int. Cl.² ........................................ G01S 1/38
[58] Field of Search ............... 343/106 D, 108 M

[56] References Cited
UNITED STATES PATENTS 3,448,453  6/1969  Earp et al. .................. 343/106 D
3,778,831  12/1973  Marchand .................. 343/106 D Primary Examiner—T.H. Tubbesing
Assistant Examiner—Richard E. Berger
Attorney, Agent, or Firm—William T. O'Neil

[57] ABSTRACT

VOR receiver which operates in known manner when receiving from normal VOR ground stations, SSB-DVOR and DSB-DVOR ground stations, and with substantially improved accuracy when receiving ASB-DVOR ground stations. When the receiver receives ASB signals, one sideband is suppressed, and the phases of the half-wave-shaped signals present after demodulation of the other sideband are measured. The azimuth is determined from the measured phase values of each complete antenna cycle by Fourier integration.

3 Claims, 4 Drawing Figures

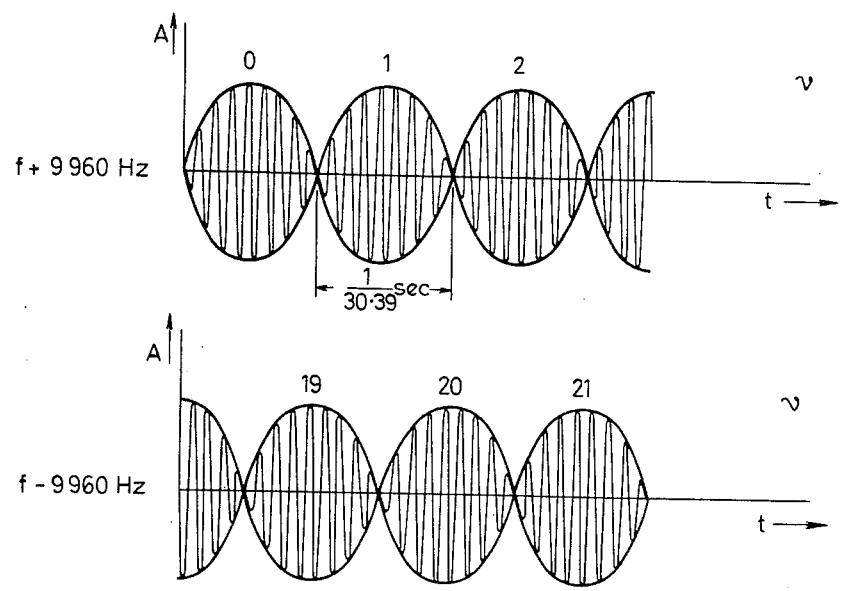
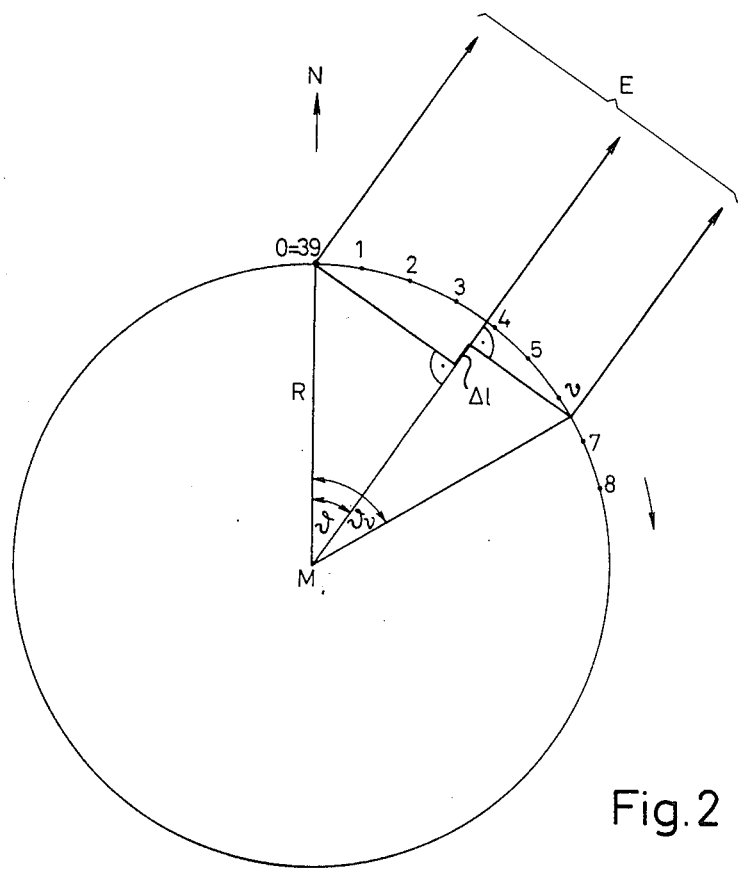

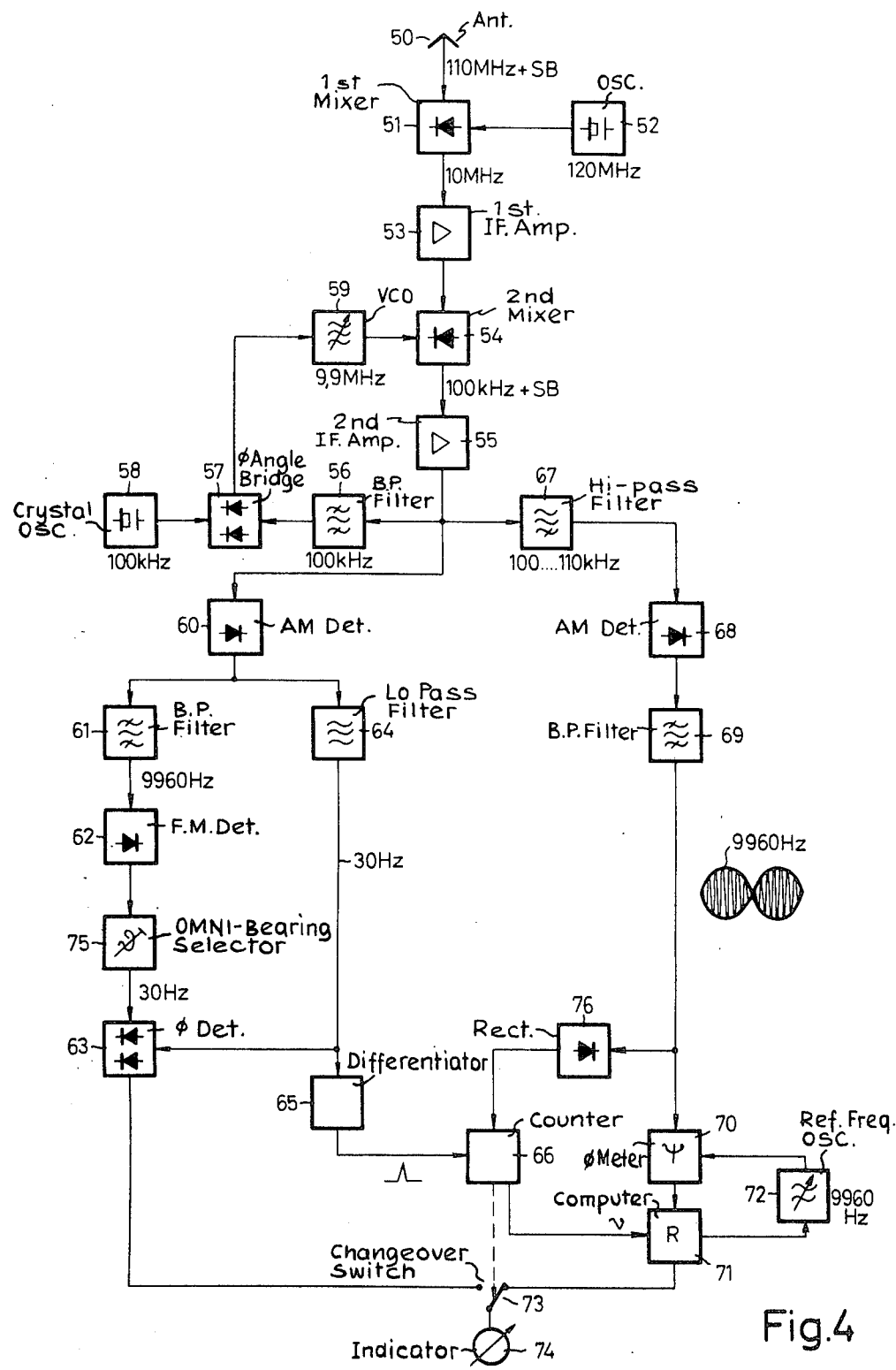

VOR RECEIVER WITH IMPROVED PERFORMANCE IN A DOPPLER NAVIGATION SYSTEM

BACKGROUND OF THE INVENTION

1. Field of the Invention

The invention relates to air navigation systems and particularly to VOR receiving systems employing the alternating sideband technique (ASB).

2. Description of the Prior Art

VOR ground and airborne equipment as known and the operation of VOR systems are described in the book entitled "Avionics Navigation Systems," Wiley 1969, pp. 163 to 170, (M. Kayton and W.R. Fried, authors).

There are normal VOR ground stations and Doppler-VOR (DVOR) ground stations which operate by single-sideband (SSB), double-sideband (DSB) or alternating-sideband (ASB) methods. All these ground stations radiate the signals so that the latter can be processed by the well known airborne equipment.

A DVOR omnidirectional radio beacon which operates by the ASB method is described in the journal "SEL-Nachrichten", 16 (1968), Part 2, pp. 44 to 53.

With the introduction of the DVOR ground stations, a considerable increase in the accuracy of the VOR systems was achieved, very good results being obtained with the ASB method, in particular. Further improvement in system accuracy through measures taken on the ground seems unlikely at present. Nor is it likely that the measurement accuracy of presently used receivers can be increased to any appreciable extent.

SUMMARY OF THE INVENTION

It is the general object of the present invention to provide an evaluating device for a VOR receiver which comes into operation on receipt of signals radiated from a ground station by the ASB method.

The novel VOR receiver achieved is independent of the accuracy with which the 30-Hz reference signal is radiated from the ground station because this signal is not used to determine the azimuth. Therefore, and since the actual measurement is very accurate, an overall accuracy higher than that of the cnventional VOR receiver is obtained.

In the receiving device of the invention, the lower received sideband is suppressed before demodulation, so that after demodulation there is no frequency-modulated signal as in a conventional VOR receiver operating with the same ground beacon signals. Rather, individual LF pulses at the typical frequency of 9960 Hz are produced and their individual phases are equal to the transit time differences between successive RF pulses. During frequency conversion these phases remain unchanged. Prior to suppression of the said lower sideband, the received frequency is divided down to a relatively low IF so that filtering of the upper sideband is readily achieved.

The novel receiver measures the phase successively of all 9960 Hz signals of each antenna rotation compared to a reference frequency and a computer determines the azimuth of the receiver from these measured phase values by Fourier integration.

BRIEF DESCRIPTION OF THE DRAWINGS

The invention will now be explained in more detail, by way of example, with reference to the accompanying drawings, in which:

FIG. 1 shows the half-wave-shaped RF signals radiated by the ASB method from a well known circular antenna array consisting of 39 radiators.

FIG. 2 is a geometrical representation used to explain how the phase differences measured by the novel receiver are obtained.

FIG. 4 is a block diagram of the novel receiver.

DESCRIPTION OF THE PREFERRED EMBODIMENT

Figure 3:
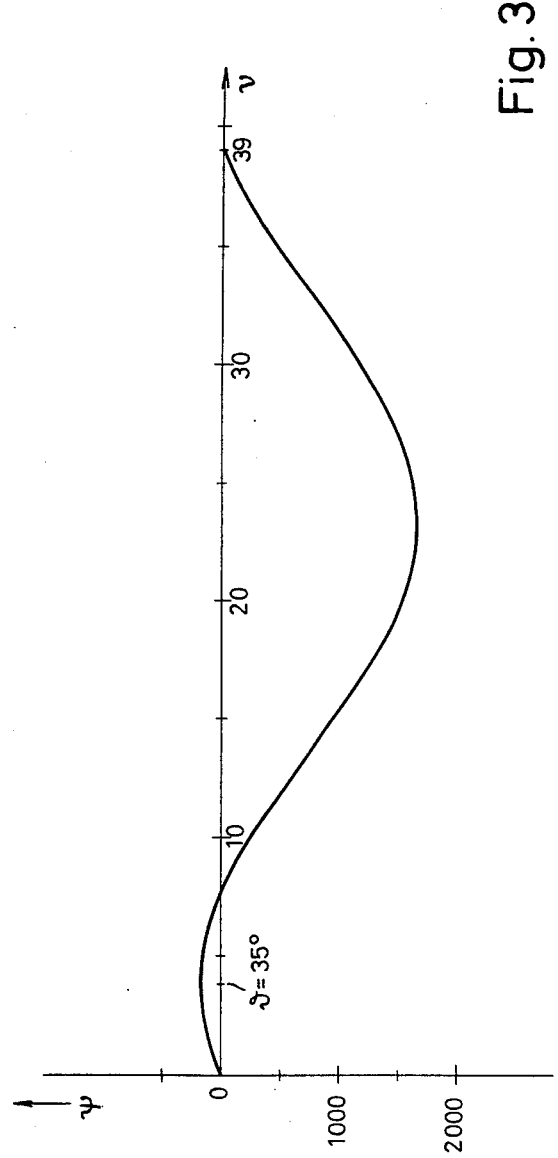
FIG. 3 shows the periodic curve of the phase values of the pulses received from the individual radiators, referenced to the radiator No. 0, which values would be obtained aboard if there were no interference.

For a better understanding of how the invention relates to the VOR systems, the DVOR omnidirectional radio beacon, which is known from "SEL-Nachrichten" and operates by the ASB method, cooperates with the novel receiver as will be first described.

The antenna system of this omnidirectional radio beacon consists typically of 39 omnidirectional antennas arranged equidistantly on a circle having a radius of $$R = \frac{8\lambda}{\pi},$$

and an additional omnidirectional antenna in the center of the circle. The transmitter generates a 30-Hz amplitude-modulated carrier frequency $f$, which is radiated from the center antenna. In the receiver the 30-Hz amplitude modulation serves as the reference signal. The transmitter also generates two sequences of half-wave-shaped RF pulses; one sequence having the frequency $f + 9,960$ Hz, and the other the frequency $f - 9,960$ Hz. The RF oscillations of the upper sideband which are contained in the pulses are coherent; the same is true of the lower sideband. The RF pulses are switched successively to the 39 omnidirectional antennas with the aid of commutators, switching being effected between successive RF pulses. The pulses for the lower sideband are precisely time staggered with respect to the pulses for the upper sideband. FIG. 1 shows the radiation sequence. The rotational frequency is 30 Hz.

The signal is demodulated in the well known prior art VOR receivers, producing a signal which is frequency-modulated at 30 Hz and having the frequency 9,960 Hz. The phase of that 30 Hz modulation is direction-dependent and forms the basis for a bearing angle determination at the receiver. Also, the 30-Hz reference signal with direction-independent phase is obtained during the demodulation. Following the frequency demodulation of the 9,960 Hz signal, a phase comparison between the two 30-Hz oscillations provides this azimuth information.

The novel receiver, according to the invention, operates quite differently. As will be explained in more detail hereinbelow, the lower sideband is suppressed before demodulation, so that after demodulation there is no frequency-modulated signal comparable to that in the conventional receiver, but only individual LF pulses with the frequency 9,960 Hz, whose phases are measured individually. The respective phases of the LF pulses are equal to the transmit-time differences of the RF pulses throughout said circular antenna commutation, which differences emanate from the different distances between the individual antennas of the circular antenna array and the receiver. During frequency conversion these phases remain unchanged.

Prior to the suppression of the lower sideband, the received frequency is divided down to as low an intermediate frequency as possible, so that filtering of the upper sideband is possible in a simpler manner.

The duration of a pulse follows from the rotational frequency of the ground antenna system and the number of radiators and is $$\Delta t = \frac{1}{(30)(39)} \text{ sec.}$$

The oscillation period of the 9,960 Hz is $$\tau = \frac{1}{9,960} \text{ sec.}$$

Thus, an RF pulse accommodates $$\frac{\Delta t}{\tau} = 8.5$$

oscillations of the 9,960 Hz.

To be able to measure the phases of the individual LF pulses, a 9,960 Hz reference frequency is generated in the receiver. For measuring the phases, the time between the zero crossings of the 9,960 Hz of the pulses and the zero crossings of the reference frequency is counted. The phases can be measured only in the range between 0° and 30°. In reality, the phases range over 1,800° because of the antenna diameter of about 5λ. The correct phase values must therefore be restored in the receiver by adding or subtracting multiples of 360°, according to a known technique.

The restored 39 phase values (i.e., corrected by the lost multiples of $2\pi$) are not yet sufficient to determine the azimuth of the receiver. The association between them and the radiators on the circle of the DVOR is needed in addition. Since the radiators are connected in succession, it is sufficient to identify one of them. To this end, the radiators are so arranged on the circle of the DVOR that the radiator with the number 0 (0 is identical with 39) is directed exactly north. The 30 Hz reference signal is fixed so that its zero crossing from positive to negative values occurs exactly at the instant the radiator 0 (directed north) radiates the upper sideband, i.e., exactly in the middle of the pulse. Therefore, it is only necessary to derive a pulse from this zero crossing and to use this pulse to set a counter to zero, which then counts from zero synchronously with the connection of the individual antennas of the circle. Thus, for each measured phase value $\Psi_\nu$, the associated number $\nu$ is obtained.

Now the determination of the azimuth from the phase values will be explained. The circular antenna system with 39 radiators is indicated in FIG. 2. The center antenna or the center of the circle is designated M. The radiator 0 is directed exactly north. It is assumed that an aircraft is located at a point in space having the azimuth $\delta = 35°$.

The receiver receives successively the RF signals transmitted from the 39 radiators and measures the phase difference between each signal and the signal coming from the radiator 0. The transit-time difference between the signal received from the $\nu$ th radiator ($\nu = 0 \ldots 38$), whose connecting line with the center M of the circle and north make an angle $\delta_\nu$, and the signal received from the radiator 0 is $\Delta l$; thus, the phase difference $$\psi_\nu = \left(\frac{2\pi}{\lambda}\right)(\Delta l).$$

From FIG. 2 it can be seen that $$\psi_\nu = \left(\frac{2\pi}{\lambda}\right)(R)[\cos(\delta_\nu - \delta) - \cos\delta] \qquad \text{Eq. 1}$$

Substituting $$\delta_\nu = \nu \frac{2\pi}{39},$$

gives $$\psi_\nu = \left(\frac{2\pi}{\lambda}\right)(R)\left[\cos\left(\nu \frac{2\pi}{39} - \delta\right) - \cos\delta\right] \qquad \text{Eq. 2}$$

If the pulses from all radiators arrived at the receiver undisturbed by multipath propagation and if the phase difference between the pulses from all radiators and the pulse from the radiator 0, i.e., the reference radiator, were measured, the curve of FIG. 3 would be obtained for one antenna rotation. The curve is also obtained by calculation from Equation (2) if $\delta = 35°$ is substituted. As can be seen, the curve is a cosine function whose maximum is shifted with respect to north by the angle $\delta$.

In reality, due to multipath propagation, the measured phase values are falsified and the azimuth can no longer be determined in a simple manner from the distorted curve obtained in reality.

However, since the function is a periodic one, a Fourier analysis can be used to determine the fundamental of the distorted curve, which then corresponds to the curve of FIG. 3.

According to Fourier, the function $\psi(\nu)$, given at 39 equidistant points, can be represented by the finite series $$\psi(\nu) = A0 + A1\left(\cos\nu\frac{2\pi}{39}\right) + A2\left(\cos 2\nu\frac{2\pi}{39}\right) + \ldots A19\left(\cos 19\nu\frac{2\pi}{39}\right)$$

$$+ B1\left(\sin\nu\frac{2\pi}{39}\right) + B2\left(\sin 2\nu\frac{2\pi}{39}\right) + \ldots B19\left(\sin 19\nu\frac{2\pi}{39}\right) \qquad \text{Eq. 3}$$

The coefficients of the fundamental are calculated from the measured values according to the Equations:

$$A1 = \frac{2}{39}\sum_{\nu=0}^{\nu=38}\psi_\nu \cos\nu\frac{2\pi}{39}$$

$$B1 = \frac{2}{39}\sum_{\nu=0}^{\nu=38}\psi_\nu \sin\nu\frac{2\pi}{39}$$

Eq. 4

The phase of the fundamental is the angle δ, which had to be found. This angle is calculated, in known manner, from the relationship:

$$tg\ \delta = -\frac{B1}{A1} \qquad \text{Eq. 5}$$

If A1 < 0, δ will be increased by 180°.

A physical realization of the novel receiver will now be described with reference to the block diagram (FIG. 4). The receiver is typically designed for the frequency range 108 to 118 MHz. For simplification it is assumed that the received frequency is 110 MHz. The means for setting the received frequency are not shown, but are, of course, well known in the art.

The received frequency of 110 MHz (carrier and both sidebands) is fed from an antenna 50 to a first mixer 51, where it is mixed with the frequency of 120 MHz of an oscillator 52. Thus, the first intermediate frequency is 10 MHz. This intermediate frequency is amplified in a first IF amplifier 53 and fed to a second mixer 54, whose output is followed by a second IF amplifier 55 for the carrier, divided to 100 KHz, and for both sidebands. A band-pass filter 56 for 100 KHz and a phase-angle bridge 57 belong to a phase control loop with a voltage-controlled oscillator (VCO) 59, which delivers at its output frequency of 9.9 MHz, which is the oscillator frequency for the second mixer 54. A crystal oscillator 58 provides the reference frequency of 100 KHz for the phase-angle bridge 57.

The output signal of the second IF amplifier 55 is also applied to the portion shown at the lower left, which represents the LF portion of the well known VOR receiver, and to the novel LF portion shown at the lower right.

The left portion comprises known components and contains an AM detector 60 whose output signal is fed to a band-pass filter 61 for 9,960 Hz and a low-pass filter 64 for 30 Hz. The band-pass filter 61 is followed by an FM detector 62, which, in turn, is followed by an omnibearing selector 75, which provides the 30 Hz rotational signal. This signal is compared in a phase meter (Detector) 63 with the output signal of the low-pass filter 64, which is the 30 Hz reference signal. The measured phase value corresponds to the azimuth at which the aircraft is located. It is fed via a changeover switch 73 to an indicator 74. The changeover switch is in the position opposite that shown if signals are received from a normal VOR ground station or from a DVOR ground station operating by the SSB or DSB methods.

The novel LF portion, shown at the lower right, contains a high-pass filter 67 which passes only the divided carrier and the upper sideband. Thus, the lower sideband is not longer present at the output of 67. The signal is applied from 67 to an AM detector 68 and from there to a band-pass filter 69 for 9,960 Hz. At the output of this band-pass filter half-wave-shaped LF pulses are developed, the frequency within the pulses being 9,960 Hz.

It is also possible as an alternative, to replace the high-pass filter 67 by a band-pass filter for 110 KHz and the AM detector 68 by a mixer to which the 100 KHz of the crystal oscillator 58 is applied as the second signal.

The novel LF portion also includes a counter 66 with 39 steps to which are applied the output signal of the band-pass filter 69, which has been rectified by means of a rectifier 76. The counter 66 is set to zero at the negative-going zero crossing of the 30 Hz reference signal. The zero-setting pulses are derived from the output signal of the low-pass filter 64 by means of a differentiator 65. From zero, the counter 66 advances by one step at each pulse appearing at the output of the band-pass filter 69. In addition, a phase meter 70 measures the phase of the 9,960 Hz of each pulse with respect to the phase of the signal generated by a reference-frequency oscillator 72. The oscillator 72 is locked to the phase of the pulse from the radiator 0. Under the control of the counter 66, the measured phase values, together with the number of the radiator, are fed to a computer 71, which performs the calculations according to Equations 4 and 5. The calculated azimuth value is fed from the output of the computer 71 via the changeover switch 73 to the indicator 74. Controlled by the counter 66, the changeover switch 73 moves to the position shown only if the counter steadily advances step by step. This is the case if signals from an ASB ground station are received.

After a full cycle, which consists of 39 RF pulses, the measured values must occur again. If, however, the reference frequency does not exactly agree with the measured frequency of 9,960 Hz, successive measured phase values associated with the same outer radiator of the DVOR will differ by a constant quantity. This quantity can be very accurately determined by comparing the measured values of two successive rotations and can be used to readjust the reference frequency. Thus, the reference frequency is synchronized.

What is claimed is

1. In a VOR airborne receiver for providing air derivation of azimuth angle data at least from an alternating side band type ground beacon, the latter providing signal transmissions successively from each of n contiguous radiators arranged on a circle, and from a reference antenna substantially at the center of said circle, said signal transmission including a sequence of half-wave-shaped signals of frequency on the order of 9960 Hz as a modulation of a higher carrier frequency and with a repetition frequency on the order of 30 Hz, the latter corresponding to the rate of commutation of said circle of radiators, said 30 Hz being air derivable as a reference signal; the combination comprising:

means within said receiver for measuring the phase of said half-wave-shaped signals received from each of said radiators with respect to said reference antenna to produce a sequence of phase values repetitive at said rate of commutation of said circle of radiators, said phase values being influenced by multi-path as well as direct signals from said ground beacon;

and means for responsive to said sequence of phase values for determining a value thereof representative of the azimuth of said receiver with respect to said sequence and phase comparison against said 30 Hz reference frequency.

2. Apparatus according to claim 1 in which said modulation of frequency 9960 Hz is frequency modulation of said carrier and said 30 Hz reference signal is supplied as amplitude modulation of said frequency modulated carrier.

3. Apparatus according to claim 1 in which said receiver also includes the known circuits of a VOR receiver for comparing the phase of said 30 Hz reference signal with the 30 Hz reference signal with the 30 Hz signal air derived at a shifted phase with respect to said reference signal, to determine azimuth by Fourier integration, and comprising:

a counter connected to be zero set at each negativegoing zero crossing of said 30 Hz reference signal, said counter further being connected to said 9960 Hz signal and advance count only if said 9960 Hz signal emanates from an alternating sideband ground beacon arrangement, said counter in that case being arranged to activate a switch to a first position;

a computer responsive to the output of said counter and to said phase sequence, to perform said Fourier integration;

and an indicator capable of indicating azimuth angles as a function of the output of said computer operating to provide the fundamental frequency component of said phase sequence, said switch first position serving to connect said computer output to said indicator.

* * * * *